United States Patent
Krogman et al.

(10) Patent No.: US 10,338,287 B2
(45) Date of Patent: Jul. 2, 2019

(54) INFRARED-REJECTING OPTICAL PRODUCTS HAVING PIGMENTED COATINGS

(71) Applicant: SOUTHWALL TECHNOLOGIES INC., Palo Alto, CA (US)

(72) Inventors: Kevin C. Krogman, Santa Clara, CA (US); Jeremy L. Isbell, Sunnyvale, CA (US); Lee Campbell Boman, Belmont, CA (US); Yuriy Matus, Pleasanton, CA (US); Kayur Patel, San Jose, CA (US)

(73) Assignee: Southwall Technologies Inc., Palo Alto, CA (US)

( * ) Notice: Subject to any disclaimer, the term of this patent is extended or adjusted under 35 U.S.C. 154(b) by 22 days.

(21) Appl. No.: 15/689,493

(22) Filed: Aug. 29, 2017

(65) Prior Publication Data

US 2019/0064407 A1  Feb. 28, 2019

(51) Int. Cl.
*G02B 5/20* (2006.01)
*G02B 5/26* (2006.01)
(Continued)

(52) U.S. Cl.
CPC .......... *G02B 5/208* (2013.01); *B32B 17/1022* (2013.01); *B32B 17/10036* (2013.01);
(Continued)

(58) Field of Classification Search
CPC . G02B 5/208; G02B 5/20; G02B 1/14; G02B 5/003; G02B 5/26; E06B 9/24; E06B 2009/2417; B60J 1/00
(Continued)

(56) References Cited

U.S. PATENT DOCUMENTS 2,282,026 A   5/1942   Bren et al.
2,282,057 A   5/1942   Hopkins et al.
(Continued)

FOREIGN PATENT DOCUMENTS

CN   1765827 A     5/2006
EP   1 046 068 B1  5/2003
(Continued)

OTHER PUBLICATIONS

Co-pending U.S. Appl. No. 15/947,891, filed Apr. 9, 2018, Krogman et al.
(Continued)

*Primary Examiner* — William R Alexander
(74) *Attorney, Agent, or Firm* — Michael K. Carrier (57) ABSTRACT

Optical products are disclosed that include a polymeric substrate, provided with an infrared-reflective metal layer on an outer surface thereof that is subject to oxidation. The optical products are further provided with a protective coating, comprising one or more of a metal oxide or a metal nitride, deposited directly on the infrared-reflective metal layer using chemical vapor deposition. The optical products are further provided with a composite pigment coating, deposited on the protective coating, that include at least a first layer and a second layer, at least one of which layers comprises a first pigment, wherein each of the first layer and the second layer includes a binding group component, each of which binding group components together form a complementary binding group pair.

20 Claims, 2 Drawing Sheets (51) Int. Cl.
*G02B 1/14* (2015.01)
*G02B 5/00* (2006.01)
*E06B 9/24* (2006.01)
*B32B 17/10* (2006.01)
*B32B 27/36* (2006.01)
*B60J 1/00* (2006.01)

(52) U.S. Cl.
CPC .. *B32B 17/10201* (2013.01); *B32B 17/10651* (2013.01); *B32B 17/10779* (2013.01); *B32B 27/36* (2013.01); *E06B 9/24* (2013.01); *G02B 1/14* (2015.01); *G02B 5/003* (2013.01); *G02B 5/26* (2013.01); *B60J 1/00* (2013.01); *E06B 2009/2417* (2013.01)

(58) Field of Classification Search
USPC .......................................................... 359/359
See application file for complete search history.

(56) References Cited

U.S. PATENT DOCUMENTS

| | | | |
|---|---|---|---|
| 3,978,264 A | 8/1976 | Tarbell et al. | |
| 4,337,990 A | 7/1982 | Fan et al. | |
| 4,410,501 A | 10/1983 | Taramasso et al. | |
| 4,952,457 A | 8/1990 | Cartier et al. | |
| 4,973,511 A | 11/1990 | Farmer et al. | |
| 5,019,197 A | 5/1991 | Henderson | |
| 5,071,206 A | 12/1991 | Hood et al. | |
| 5,091,258 A | 2/1992 | Moran | |
| 5,264,058 A | 11/1993 | Hoagland et al. | |
| 5,609,943 A | 3/1997 | DeKoven et al. | |
| 5,818,564 A | 10/1998 | Gray et al. | |
| 5,925,228 A | 7/1999 | Panitz et al. | |
| 5,956,175 A | 9/1999 | Hojnowski | |
| 6,030,671 A | 2/2000 | Yang et al. | |
| 6,055,088 A | 4/2000 | Fix et al. | |
| 6,221,112 B1 | 4/2001 | Snider | |
| 6,489,028 B1 | 12/2002 | Degand et al. | |
| 6,627,175 B2 | 9/2003 | Schoebrechts | |
| 6,881,444 B2 | 4/2005 | Hong et al. | |
| 6,929,864 B2 | 8/2005 | Fleming et al. | |
| 7,311,943 B2 | 12/2007 | Jacobson et al. | |
| 7,659,002 B2 | 2/2010 | Coster et al. | |
| 7,892,647 B2* | 2/2011 | Fisher | B32B 17/10174 252/582 |
| 7,951,473 B2 | 5/2011 | Maschwitz | |
| 8,234,998 B2 | 8/2012 | Krogman et al. | |
| 8,277,899 B2 | 10/2012 | Krogman et al. | |
| 8,689,726 B2 | 4/2014 | Krogman et al. | |
| 8,882,267 B2 | 11/2014 | Ishak et al. | |
| 9,387,505 B2 | 7/2016 | Krogman et al. | |
| 9,817,166 B2 | 11/2017 | Boman et al. | |
| 9,891,357 B2 | 2/2018 | Boman et al. | |
| 2001/0046564 A1 | 11/2001 | Kotov | |
| 2001/0048975 A1 | 12/2001 | Winterton et al. | |
| 2002/0055552 A1 | 5/2002 | Schliesman et al. | |
| 2003/0167878 A1 | 9/2003 | Al-Salim et al. | |
| 2003/0224182 A1 | 12/2003 | Simpson et al. | |
| 2004/0047979 A1 | 3/2004 | Qiu et al. | |
| 2004/0224095 A1 | 11/2004 | Miller | |
| 2004/0229049 A1 | 11/2004 | Boire | |
| 2005/0019550 A1 | 1/2005 | McGurran et al. | |
| 2005/0025976 A1 | 2/2005 | Faris | |
| 2005/0208319 A1* | 9/2005 | Finley | C03C 17/42 428/545 |
| 2006/0029634 A1 | 2/2006 | Berg et al. | |
| 2006/0234032 A1 | 10/2006 | Morrison et al. | |
| 2007/0032869 A1 | 2/2007 | Gilliard et al. | |
| 2007/0053088 A1 | 3/2007 | Kranz | |
| 2007/0054194 A1 | 3/2007 | Zhang et al. | |
| 2007/0104922 A1 | 5/2007 | Zhai et al. | |
| 2008/0060302 A1 | 3/2008 | Bletsos et al. | |
| 2008/0233371 A1 | 9/2008 | Hayes et al. | |
| 2008/0299036 A1 | 12/2008 | Vitner et al. | |
| 2009/0015908 A1 | 1/2009 | Ando et al. | |
| 2009/0029077 A1 | 1/2009 | Atanasoska et al. | |
| 2009/0148707 A1 | 6/2009 | Anderson et al. | |
| 2009/0153953 A1 | 6/2009 | Banerjee et al. | |
| 2009/0155545 A1 | 6/2009 | Purdy et al. | |
| 2009/0161220 A1 | 6/2009 | Banerjee et al. | |
| 2009/0162592 A1* | 6/2009 | Baikerikar | C03C 17/30 428/38 |
| 2009/0209665 A1 | 8/2009 | Fu et al. | |
| 2009/0324910 A1 | 12/2009 | Gemici et al. | |
| 2010/0003499 A1 | 1/2010 | Krogman et al. | |
| 2010/0047620 A1* | 2/2010 | Decker | B05D 7/54 428/688 |
| 2010/0092377 A1 | 4/2010 | Scott et al. | |
| 2010/0098902 A1 | 4/2010 | Kotov et al. | |
| 2010/0189913 A1 | 7/2010 | Kotov et al. | |
| 2010/0190001 A1* | 7/2010 | Barton | B32B 17/10 428/337 |
| 2010/0208349 A1 | 8/2010 | Beer et al. | |
| 2010/0209593 A1 | 8/2010 | Banerjee et al. | |
| 2010/0304150 A1 | 12/2010 | Zheng et al. | |
| 2010/0315693 A1 | 12/2010 | Lam et al. | |
| 2011/0014366 A1 | 1/2011 | Nogueira et al. | |
| 2011/0089018 A1 | 4/2011 | Chang et al. | |
| 2011/0135888 A1 | 6/2011 | Xu et al. | |
| 2011/0195239 A1 | 8/2011 | Takane | |
| 2011/0274767 A1 | 11/2011 | Kato et al. | |
| 2012/0028005 A1 | 2/2012 | Zheng et al. | |
| 2012/0052317 A1* | 3/2012 | Shi | C09B 67/0033 428/522 |
| 2012/0082831 A1 | 4/2012 | Wang et al. | |
| 2012/0194819 A1 | 8/2012 | Varma | |
| 2013/0003206 A1* | 1/2013 | Kabagambe | C03C 17/38 359/883 |
| 2013/0108832 A1 | 5/2013 | Domercq et al. | |
| 2013/0183516 A1 | 7/2013 | Krogman et al. | |
| 2013/0273242 A1 | 10/2013 | Krogman et al. | |
| 2013/0278989 A1* | 10/2013 | Lam | B60J 3/04 359/275 |
| 2014/0079884 A1 | 3/2014 | Krogman et al. | |
| 2014/0079922 A1 | 3/2014 | Wang et al. | |
| 2014/0218792 A1 | 8/2014 | Krogman et al. | |
| 2014/0220351 A1 | 8/2014 | Krogman et al. | |
| 2014/0242321 A1 | 8/2014 | Schmid et al. | |
| 2014/0242393 A1 | 8/2014 | Olmeijer et al. | |
| 2015/0285956 A1 | 10/2015 | Schmidt et al. | |
| 2016/0137802 A1 | 5/2016 | Lee et al. | |
| 2016/0168035 A1 | 6/2016 | Matus et al. | |
| 2016/0170104 A1 | 6/2016 | Nand et al. | |
| 2016/0230017 A1* | 8/2016 | Woolf | C09D 5/004 |
| 2017/0075045 A1* | 3/2017 | Medwick | F24S 23/82 |

FOREIGN PATENT DOCUMENTS

| | | |
|---|---|---|
| EP | 2 130 844 A1 | 12/2009 |
| EP | 2226364 A1 | 9/2010 |
| EP | 2 343 579 A1 | 7/2011 |
| GB | 1 511 652 A | 5/1978 |
| GB | 2 198 739 A | 6/1988 |
| JP | H 04 197427 A | 7/1992 |
| JP | 11 292537 A | 10/1999 |
| JP | 2006-301125 A | 11/2006 |
| JP | 2008 041377 A | 2/2008 |
| JP | 2008-188513 A | 8/2008 |
| JP | 2010 132514 A | 6/2010 |
| KR | 10-2004-0086912 A | 10/2004 |
| KR | 10-2005-0059582 A | 6/2005 |
| KR | 10-2011-0082625 A | 7/2011 |
| KR | 10-2011-0083729 A | 7/2011 |
| WO | WO 00/10934 A1 | 3/2000 |
| WO | WO 2005/072947 A1 | 8/2005 |
| WO | WO 2006/100060 A2 | 9/2006 |
| WO | WO 2010/044402 A1 | 4/2010 |
| WO | WO 2011/144754 A2 | 11/2011 |
| WO | WO 2012/075309 A1 | 6/2012 |
| WO | WO 2014/099367 A1 | 6/2014 |
| WO | WO 2014/150903 A1 | 9/2014 |
| WO | WO 2014/172139 A2 | 10/2014 |

(56) References Cited

FOREIGN PATENT DOCUMENTS

| WO | WO 2014/172332 A1 | 10/2014 |
|---|---|---|
| WO | WO 2014/193550 A1 | 12/2014 |
| WO | WO 2015/095317 A1 | 6/2015 |

OTHER PUBLICATIONS

Co-pending U.S. Appl. No. 15/947,903, filed Apr. 9, 2018, Krogman et al.
Co-pending U.S. Appl. No. 14/569,955, filed Dec. 15, 2014, Nand et al.
ASTM G173-03; Standard Tables for Reference Solar Spectral Irradiances: Direct Normal and Hemispherical on 37° Tilted Surface.
ASTM D1003-07; Standard Test Method for Haze and Luminous Transmittance of Transparent Plastics.
ASTM D1787-89; Standard Test Method for Pentosans in Cellulose.
ASTM D3359-09$^{e2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Lee et al.; "Formation of Nanoparticle-Loaded Microcapsules Based on Hydrogen-Bonded Multilayers"; Chem. Mater.; 2005, vol. 17; pp. 1099-1105.
Nolte, Adam John; "Fundamental Studies of Polyelectrolyte Multilayer Films: Optical, Mechanical, and Lithographic Property Control"; Thesis (PhD); Massachusetts Institute of Technology; Dept. of Materials Science and Engineering; Feb. 2007 (Abstract, pp. 32-29, Figure 2.3).
Rouse, et al.; "Sol-Gel Processing of Ordered Multilayers to Produce Composite Films of Controlled Thickness"; Chem. Mater.; 2000; 12; pp. 2502-2507.
Kim, et al.; "Synthesis and Structures of New Layered Ternary Manganese Tellurides: AMnTe$_2$ (A=K, Rb, Cs) Na$_3$Mn$_4$Te$_6$, and NaMn$_{1.56}$Te$_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 dated Jun. 6, 2012.
PCT International Search Report for International Application No. PCT/US2012/025138 dated Oct. 30, 2012.
PCT International Search Report for International Application No. PCT/US2012/059147 dated Mar. 28, 2013.
PCT International Search Report for International Application No. PCT/US2012/062892 dated Mar. 29, 2013.
PCT International Search Report for International Application No. PCT/US2012/059142 dated Apr. 29, 2013.
PCT International Search Report for International Application No. PCT/US2013/059337 dated Dec. 6, 2013.
USPTO Office Action dated May 21, 2014 in co-pending U.S. Appl. No. 14/024,649.
USPTO Office Action dated Jul. 23, 2014 in co-pending U.S. Appl. No. 13/633,809.
USPTO Office Action dated Sep. 25, 2014 in co-pending U.S. Appl. No. 14/024,649.
USPTO Office Action dated Feb. 11, 2015 in co-pending U.S. Appl. No. 13/633,809.
USPTO Office Action dated Jun. 5, 2015 in co-pending U.S. Appl. No. 13/861,368.
USPTO Office Action dated Jul. 8, 2015 in co-pending U.S. Appl. No. 14/246,084.
Cammarata, et al.; "Carbodiimide Induced Cross-Linking, Ligand Addition, and Degradation in Gelatin"; Molecular Pharmaceutics; 2015; 12; pp. 783-793.
USPTO Office Action dated Sep. 8, 2015 in co-pending U.S. Appl. No. 13/633,809.
USPTO Office Action dated Sep. 11, 2015 in co-pending U.S. Appl. No. 14/024,649.
USPTO Office Action dated Oct. 30, 2015 in co-pending U.S. Appl. No. 14/028,450.
Wu et al.; "Deformable Antireflection Coatings from Polymer and Nanoparticle Multilayers"; Advanced Materials, 2006, 18, pp. 2699-2702.
USPTO Office Action dated Nov. 5, 2015 in co-pending U.S. Appl. No. 13/967,770.
USPTO Office Action dated Dec. 4, 2015 in co-pending U.S. Appl. No. 13/861,368.
USPTO Office Action dated Dec. 17, 2015 in co-pending U.S. Appl. No. 14/246,096.
USPTO Notice of Allowance dated Jan. 20, 2016 in co-pending U.S. Appl. No. 14/569,955.
USPTO Notice of Allowance dated Feb. 11, 2016 in co-pending U.S. Appl. No. 14/569,955.
USPTO Office Action dated Feb. 16, 2016 in co-pending U.S. Appl. No. 13/633,809.
USPTO Office Action dated Feb. 19, 2016 in co-pending U.S. Appl. No. 14/246,084.
USPTO Office Action dated Mar. 18, 2016 in co-pending U.S. Appl. No. 14/267,944.
PCT International Search Report for International Application No. PCT/US2015/063082 dated Mar. 24, 2016.
Co-pending U.S. Appl. No. 15/134,864, filed Apr. 21, 2016, Boman et al.
Co-pending U.S. Appl. No. 15/134,875, filed Apr. 21, 2016, Boman et al.
USPTO Notice of Allowance dated Apr. 26, 2016 in co-pending U.S. Appl. No. 14/246,096.
USPTO Office Action dated May 18, 2016 in co-pending U.S. Appl. No. 14/028,450.
USPTO Office Action dated May 19, 2016 in co-pending U.S. Appl. No. 13/861,368.
USPTO Notice of Allowance dated May 20, 2016 in co-pending U.S. Appl. No. 14/024,649.
USPTO Notice of Allowance dated May 20, 2016 in co-pending U.S. Appl. No. 14/246,096.
USPTO Notice of Allowance dated May 24, 2016 in co-pending U.S. Appl. No. 13/967,770.
USPTO Office Action dated Jun. 16, 2016 in co-pending U.S. Appl. No. 13/633,809.
PCT International Search Report for International Application No. PCT/US2016/028757 dated Sep. 1, 2016.
USPTO Office Action dated Sep. 6, 2016 in co-pending U.S. Appl. No. 13/861,368.
Co-pending U.S. Appl. No. 15/274,348, filed Sep. 23, 2016, Nand et al.
USPTO Office Action dated Sep. 26, 2016 in co-pending U.S. Appl. No. 14/267,944.
Supplementary European Search Report dated Nov. 4, 2016 for European Patent Application No. 13836268.6.
Hiller, Jeri'Ann et al, "Reversibly erasable nanoporous antireflection coatings from polyelectrolyte multilayers", Nature Materials, vol. 1, No. 1, Sep. 1, 2002, pp. 59-63, XP055016249.
PCT International Search Report for International Application No. PCT/US2016/028756 dated Nov. 29, 2016.
USPTO Notice of Allowance dated Jun. 29, 2017 in co-pending U.S. Appl. No. 15/274,348.
USPTO Notice of Allowance dated Jul. 6, 2017 in co-pending U.S. Appl. No. 15/1473.
USPTO Notice of Allowance dated Jul. 6, 2017 in co-pending U.S. Appl. No. 15/134,875.
Co-pending U.S. Appl. No. 15/689,493, filed Aug. 29, 2017, Krogman et al.
USPTO Notice of Allowance dated Oct. 6, 2017 in co-pending U.S. Appl. No. 15/134,864.

(56) References Cited

OTHER PUBLICATIONS

USPTO Notice of Allowance dated Oct. 11, 2017 in co-pending U.S. Appl. No. 15/134,875.
USPTO Notice of Allowance dated Oct. 11, 2017 in co-pending U.S. Appl. No. 15/274,348.
PCT International Search Report for International Application No. PCT/US2018/045933 dated Nov. 30, 2018.

* cited by examiner

INFRARED-REJECTING OPTICAL PRODUCTS HAVING PIGMENTED COATINGS

FIELD OF THE INVENTION

The present invention broadly relates to optical products for use, for example, in automotive and architectural window applications, and methods for their manufacture. More particularly, the invention relates to infrared-rejecting films having one or more metal layers, a protective layer, and a pigmented composite coating.

BACKGROUND OF THE INVENTION

In order to reduce the transmittance of infrared, visible and ultraviolet radiation through the window of a building or vehicle, the art has developed a variety of different products which can be adhered to planar or curved windows. The products, often referred to as solar control films or sheets, alter the solar energy transmission, reflection, and absorption of the window. The most common function is to reduce solar heat gain, thereby improving comfort and reducing cooling load within an architectural structure or a vehicle.

Many solar control films use an infrared-reflecting metal such as aluminum, copper, or silver as a thin film layer and the reflection level in the infrared wavelengths is increased in these layers, making them at least somewhat spectrally selective. However, such thin metal layers are subject to rapid oxidation under basic or acidic conditions, especially in the presence of salt. This is especially problematic if these layers have further layers applied to them using aqueous techniques. Various methods have been used to improve the performance of such layers while protecting them from oxidation.

U.S. Pat. No. 5,956,175 describes a solar control window film comprised of a transparent substrate bearing a thin, optically transparent layer of metal, an optically transparent layer of near infrared energy absorbing material and a transparent layer of protective material overlying and protecting the near infrared energy absorbing material and the metal.

U.S. Pat. No. 6,929,864 discloses a film containing first and second metal or metal alloy layers separated by a crosslinked polymeric spacing layer whose thicknesses are such that the film is extensible visible light-transmissive and infrared reflective. The film can be joined or laminated into glazing (especially non-planar vehicular safety glazing) with reduced likelihood that the metal or metal alloy layers will be damaged or distorted.

U.S. Pat. No. 7,659,002 discloses low-emissivity stacks comprising at least one absorbing layer. The low-emissivity coatings comprise, in order outward from the substrate, a first dielectric layer, a first Ag layer, a first barrier layer, a first absorbing layer, a second dielectric layer, a second Ag layer, a second absorbing layer, a third dielectric layer, and optionally, a topcoat layer. Methods are also disclosed for depositing such coatings on substrates.

U.S. Pat. No. 7,951,473 discloses optical coatings with improved durability, the coating comprising a durability enhancing layer, a nucleation layer and an infrared reflecting layer. The patent also discloses methods of making thin film layers having enhanced durability.

U.S. Pat. Publn. No. 2014/0242321, having common assignee herewith, the disclosure of which is incorporated herein by reference, discloses methods and materials for preparing bridging films. In one aspect, the bridging films are non-porous and are suitable for protecting adjacent porous films. For example, the bridging films contact a porous film and protect the porous film from transfer of gases and/or liquids into the pores of the porous film. In another example, bridging films protect the porous film from abrasion.

U.S. Pat. Publn. No. 2015/0285956 discloses methods of making a multilayer optical film. In one embodiment, the method comprises providing a multilayer optical film and disposing onto the multilayer optical film a plurality of layers deposited by layer-by-layer self-assembly of nanoparticles, polymers, and combinations thereof. The multilayer optical film typically comprises a plurality of alternating polymeric layers of a low refractive index layer and a high refractive index layer that reflects at least one bandwidth of electromagnetic radiation ranging from ultraviolet to near infrared. Multilayer optical film articles are also disclosed that comprise a plurality of layers disposed onto the multilayer optical film, wherein the plurality of layers comprises layer-by-layer self-assembled nanoparticles, polymers, and combinations thereof.

U.S. Pat. Appln. Publn. No. 2016/0168035 discloses an optical product for use in products such as window films and electronic displays, that includes a polymeric substrate and a hardcoat having a defined abrasion resistance and permeability. The hardcoat may comprise silicon oxide.

U.S. Pat. No. 5,071,206 discloses visually transparent, color corrected, infrared reflecting films for solar heat control that employ Fabry-Perot sandwich interference filters having three or more transparent layers of sputter-deposited metal such as silver directly contiguous with dielectric spacer layers and optionally boundary layers. The document acknowledges that certain prior art products of this type can exhibit a strong color cast.

Color correction has typically been imparted to optical products such as solar control films by use of organic dyes. More particularly, current commercial practice for producing dyed film from polyester involves swelling of the molecular structure of the substrate in baths of hot organic solvent such as ethylene glycol during the dyeing process, as swelled polyester (particularly PET) films are capable of absorbing organic dyes. These films and their manufacturing processes suffer many drawbacks.

Firstly, the substrates require exposure to organic solvents and elevated temperatures, which present both mechanical and chemical challenges such as environmental hazards and costs associated with storing the raw solvents and disposing of the resulting waste. Further, swelled substrates require special handling to avoid downstream stretching thereby decreasing the production yield. Next, the elevated polyester processing temperatures and residual solvents in the substrate film after drying constrain downstream use and processing of substrates which in turn limits the potential end-use applications for such dyed films. On the process side, the existing methodology uses large volume dye baths which makes rapid color change within commercial manufacturing difficult. Finally, only a limited number of organic dyes are soluble and stable in the hot solvent swelling media and many of those are subject to degradation by high energy radiation (sub 400 nm wavelength) to which the substrate is subjected when used in window film applications, thereby shortening the useful lifetime of the product.

To address these drawbacks, some film manufacturers have transitioned to using a pigmented layer on the surface of a base polymeric film for tinting a polymeric film. For example, U.S. Published Application number 2005/0019550A1 describes color-stable, pigmented optical bodies comprising a single or multiple layer core having at least one layer of an oriented thermoplastic polymer material wherein the oriented thermoplastic polymer material has dispersed within it a particulate pigment. Such products can suffer a myriad of processing and performance drawbacks. For example, layers of this type are typically applied as thin films and can employ a relatively high pigment concentration to achieve a desired tint level, particularly in automotive window films with a relatively high desired level of darkening such as those with an electromagnetic energy transmittance in the visible region (or $T_{vis}$) of less than 50%. These high pigment concentrations are difficult to uniformly disperse within the thin layer. More generally, pigmented layers can suffer from greater haze and reduced clarity even in applications (for example architectural window films) with a relatively moderate, low and even minimal levels of desired darkening.

U.S. Pat. No. 9,453,949 discloses an electromagnetic energy-absorbing optical product useful particularly for automotive and architectural window films. The electromagnetic energy-absorbing optical product includes a polymeric substrate and a composite coating that includes first and second layers, each containing a binding group component which together form a complementary binding group pair. One of the layers may be provided with an electromagnetic energy-absorbing particle which may be a pigment.

A continuing need nonetheless exists in the art for infrared-rejecting optical products that meet haze, clarity, surface uniformity, UV-stability and product longevity demands of current commercial window films as well as automotive window and vehicle coloring and/or protection films, that are resistant to oxidation, and that allow application of a pigmented coating layer capable of manufacture by an environmentally friendly, aqueous-based coloring process that may be performed at ambient temperatures and pressures.

SUMMARY OF THE INVENTION

In one aspect, the invention relates to optical products such as window films that include a polymeric substrate, provided with an infrared-reflective metal layer on an outer surface that is subject to oxidation. The optical products further include a protective coating, comprising one or more of a metal oxide or a metal nitride, deposited directly on the infrared-reflective metal layer using physical or chemical vapor deposition. The optical products are further provided with a composite pigment coating, deposited on the protective coating, comprising at least a first layer and a second layer, at least one of which layers comprises a first pigment, wherein each of the first layer and the second layer includes a binding group component, each of which binding group components together form a complementary binding group pair.

Further aspects of the invention are as disclosed and claimed herein.

BRIEF DESCRIPTION OF THE DRAWINGS

The invention will be described in further detail below, and with reference to the accompanying drawings, wherein like reference numerals throughout the figures denote like elements and wherein.

DETAILED DESCRIPTION

Thus, the present invention relates to optical products such as window films that include a polymeric substrate, for example PET or PVB, provided with one or more metal or metal alloy layers (sometimes described hereinafter for convenience simply as "metal layer(s)") that are subject to oxidation. The optical products are further comprised of a metal oxide or metal nitride protective coating layer contiguous to, that is to say deposited directly on, the one or more metal or metal alloy layers, using physical or chemical vapor deposition. The products further comprise a composite pigment coating, comprising a plurality of layer-by-layer (LbL) bilayers deposited on the protective coating, at least one of which layers is or has incorporated into it a pigment. Each of the layers, as described herein, can be understood to have two faces, a first face and a second face, for the purpose of describing adjacent layers that each of the layers may be in contact with.

Figure 1:
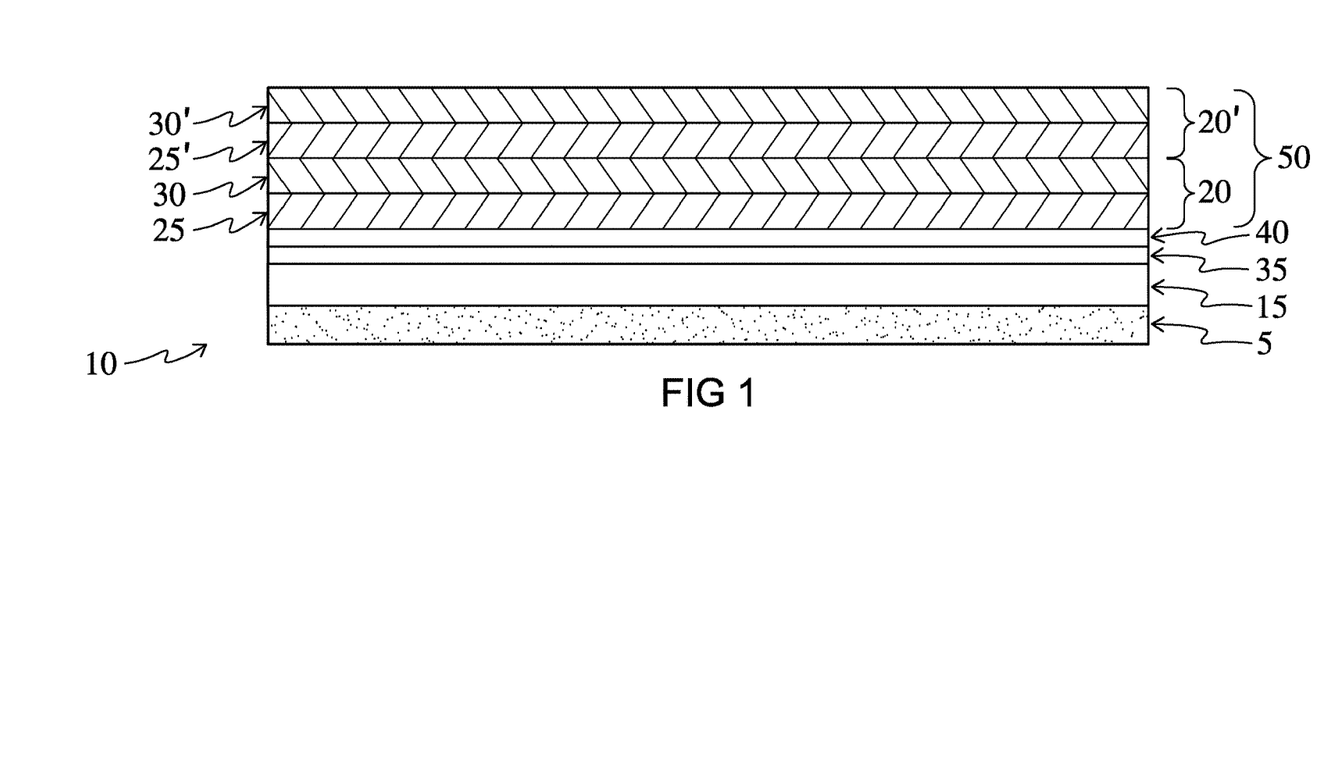
FIG. 1 is a schematic cross-section of an embodiment of the optical product of the present invention.

Referring now to FIG. 1, a schematic drawing which is not to scale, in one embodiment the present invention relates generally to optical products such as a window film 10. The window film 10 includes a polymeric substrate 15, for example PET or PVB, provided on one face with at least one metal or metal alloy layer 35 that is subject to oxidation. The optical products are further comprised of a metal oxide or metal nitride protective coating layer 40 contiguous to, that is to say deposited directly on, one face of the one or more metal or metal alloy layers, using physical or chemical vapor deposition. The products further comprise a composite pigment coating 50, comprising a plurality of layer-by-layer (LbL) bilayers 20, 20' deposited on the protective coating, at least one of which layers is or has incorporated into it a pigment. Each of the bilayers 20, 20' of the invention is further comprised of a first layer 25, 25' and a second layer 30, 30'. When used as an exterior or interior window film, the substrate may additionally have provided on its bottom an adhesive 5 for adhering the substrate to a window.

We have found that a silicon oxide protective coating layer between the composite pigment coating and the metal layer(s) protects the metal layer(s) from chemical attack, and especially oxidation, during the LbL coating application process, and may provide one or more additional features, such as ⅛ wave or ¼ wave behavior, IR reflection, IR absorption, visible light reflection or transmission, or reduced visible light transmission with increased IR rejection or reflection. The invention is useful, for example, in applying a color-imparting LbL coating to a substrate metallized with a metal, for example aluminum, which is otherwise at risk for rapid oxidation under subsequent LbL coating conditions.

Conventional window film products may combine the infrared performance of metalized films with the visible tinting of dyed PET. According to the present invention, in contrast, we provide a metalized film subject to oxidation and apply custom color using a Layer-by-Layer deposition, rather than requiring a dyed PET substrate. Provision of a protective layer between the one or more metal layers and the LbL layer allows direct deposition without requiring any further preparation of the metal layer(s) to protect it from oxidation during the LbL process.

The optical products of the invention may thus be films that are typically applied to the interior or exterior surface of a window, and preferably the interior. These films will be understood to have two faces, as does each of the layers of which the films are comprised. For purposes of this disclosure, it should also be recognized that IR energy as used herein is generally understood to be long wavelength IR radiation at wavelengths greater than about 700 nm.

When used as an exterior or interior window film, the substrate may additionally have provided on its bottom a means for adhering the substrate to a window. The optical product may thus have an adhesive layer provided on the substrate. The adhesive layer can be comprised of any adhesive that is suitable for bonding the substrate to a window. When being bonded to a window, pressure sensitive adhesives are preferable, with an acrylic-based adhesive being particularly preferable. Loctite Duro-Tak 109A (available from Henkel) is an example of such an adhesive. The adhesive layer may also have a release liner attached thereto. The release liner advantageously provides a release effect against the sticky adhesive layer. The release liner in the depicted embodiment can comprise any polyethylene terephthalate (PET) film with a silicone release coating that can be peeled from the adhesive layer leaving the adhesive layer on the base substrate. Alternatively, the adhesive and release layers may comprise a clear distortion-free adhesive with a polypropylene liner.

The present invention includes a polymeric substrate, preferably a film formed from a thermoplastic such as a polyester and preferably polyethylene terephthalate (PET). Suitable PET films are commercially available, for example from DuPont Teijin Films under the names Melinex 454 or LJX 112. Other suitable thermoplastics for forming the polymeric substrate include, for example, polyvinyl butyral, polyacrylic, polyimides, polyamides such as nylons, and polyolefins such as polyethylenes, polypropylenes and the like. The polymeric substrate may include conventional additives such as UV-absorbers, stabilizers, fillers, lubricants and the like, blended therein or coated thereon. Preferably, the polymeric substrate is transparent, which generally connotes the ability to perceive visually an object, indicia, words or the like through it.

The polymeric substrate may in the broadest sense be any substrate known in the art as useful as an optical product component. A suitable polymeric substrate is typically a flexible thermoplastic polymeric film, more particularly a polyethylene terephthalate (PET) film of a thickness, for example, from about 10µ to about 400µ, or from 15µ to 300µ, or from 20µ to 250µ; or a polyvinyl butyral (PVB) film, preferably of a thickness from 0.01 to 1 mm, or from 0.05 to 0.5 mm, or from 0.1 mm to 0.45 mm, and more preferably a thickness of 15 to 30 mils. Because window films that employ dyes exhibit a variety of drawbacks, the polymeric substrate is preferably an undyed transparent polyethylene terephthalate film. The term "undyed" means that the raw film has no appreciable color, and is not intended to exclude the presence of additives such as UV blockers that are present in small amounts and not intended to affect the appearance of the film. The polymeric substrate may also be a flexible polyurethane or flexible poly(vinyl chloride) film or may be a flexible multilayer polymeric composite film such as a polyurethane-based multilayer composite film as described for example in U.S. Pat. No. 8,765,263, the disclosure of which is incorporated herein by reference.

The polymeric substrate may further include additives known in the art to impart desirable characteristics. Examples include ultraviolet (UV) absorbing materials such as benzotriazoles, hydroxybenzophenones or triazines. A useful polymeric substrate with a UV absorbing additive incorporated therein is described in U.S. Pat. No. 6,221,112, which is incorporated herein by reference.

In one embodiment, wherein the polymeric substrate is a flexible polymeric film such as PET, the optical product may be a window film. As well known in the art, conventional window films are designed and manufactured with levels of electromagnetic energy transmittance or reflectivity that are selected based on a variety of factors such as, for example, product end-use market applications, and the like. In some settings, the desired optical properties include maximum rejection (reflection) of heat (infrared wavelengths) with less attention being paid to the amount of visible light transmitted or reflected. In other applications, specific degrees of visible light transmittance must be attained to meet government regulations, for example, in auto windshields in which regulations may require that the Tvis be 70% or greater.

The visible light transmission (VLT or $T_{vis}$) is the percent of total visible light that is transmitted through the window film/glass system. The lower the number, the less visible light transmitted. It may be calculated using CIE Standard Observer (CIE 1924 1931) and D65 Daylight. The optical products of the present disclosure may have a visible light transmission within a broad range of VLT values, depending on the emissivity and the desired transparency, for example less than about 1%; from about 2% to about 5%; from about 25% to about 50%; about 28.5% to about 47%; about 30% to about 45%; about 28.5%; about 47%; about 55%; up to about 70%; or up to about 75%, or up to about 90%.

In other embodiments, the optical product of the present invention may have visible light transmittance ($T_{vis}$ or VLT) of no more than 50%, or no more than 45% or no more than 40%. Such levels of visible light transmittance are often desired in window films with high levels of darkening for certain automotive end use applications such as sidelights In another embodiment, the optical product of the present invention has visible light transmittance or $T_{vis}$ of from 80 to 85%. Such levels of visible light transmittance are often desired in window films with relatively moderate to low levels of darkening (typically also with infrared absorption) for (to the extent permitted by governmental regulation) certain automotive end use applications such as windscreens. In yet another embodiment, the optical product of the present invention has visible light transmittance or $T_{vis}$ of no less than 85%, or no less than 88% or no less than 90%. Such levels of visible light transmittance are often desired in window films with low to minimal levels of darkening for certain architectural end use applications.

These various levels of visible light transmission may be achieved according to the invention through a combination of the reductions in visible light transmission achieved by the metal layer and by the composite pigment coating. In one aspect, then, either or both of these layers may be described functionally by the reduction in visible light transmission desired or achieved.

The window films may optionally include layers or coatings, other than the one or more metal or metal alloy layers, the protective coating layer and the composite pigment coating, that are known to those of ordinary skill in the window film art. Coatings, for example, may include adhesive layers, protective release liners, and the like, as described herein. Such layers or coatings may be components of the polymeric substrate. Further, the polymeric substrate may be a laminated or multilayer structure.

In one embodiment, the optical product is an interlayer for laminated glass. In this embodiment, the polymeric substrate is formed from film-forming materials known in the art for this purpose, including for example plasticized polyvinyl butyral (PVB), polyurethanes, polyvinyl chloride, polyvinylacetal, polyethylene, ethyl vinyl acetates and the like. A preferred film-forming material for the interlayer is a plasticized PVB such as that used in a commercially available product from Eastman Chemical Company, SAFLEX® PVB interlayer. In this embodiment, the composite coating may be formed on at least one surface of the polymeric substrate.

In an embodiment wherein the polymeric substrate is a flexible polymeric film such as PET, the optical product may be a composite interlayer for laminated glass including at least one safety film or interlayer. The safety film may be formed from film-forming materials known in the art for this purpose, including, for example, plasticized polyvinyl butyral (PVB), polyurethanes, polyvinyl chloride, polyvinylacetal, polyethylene, ethyl vinyl acetates and the like. The safety film may be a plasticized PVB film or interlayer commercially available from Eastman Chemical Company as SAFLEX® PVB interlayer. The composite interlayer may include two safety films or one film layer and one coating layer, such as a PVB coating, that encapsulate the polymeric substrate. Composite interlayers of this general type are known in the art and are described for example in U.S. Pat. Nos. 4,973,511 and 5,091,258, the contents of which are incorporated herein by reference.

The polymer substrates described herein may thus include one or more thermoplastic polymers. Examples of suitable thermoplastic polymers can include, but are not limited to, poly(vinyl acetal) resins (such as PVB), polyurethanes ("PU"), poly(ethylene-co-vinyl)acetates ("EVA"), polyvinyl chlorides ("PVC"), poly(vinyl chloride-co-methacrylate), polyethylene, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, the thermoplastic polymer can be selected from the group consisting of poly(vinyl acetal) resins, polyvinyl chloride, and polyurethanes, or the resin can comprise one or more poly(vinyl acetal) resins. Although some of the polymer layers may be described herein with respect to poly(vinyl acetal) resins, it should be understood that one or more of the above polymer resins and/or polymer layers including the polymer resins could be included with, or in the place of, the poly(vinyl acetal) resins described below in accordance with various embodiments of the present invention.

When the polymeric substrates described herein include poly(vinyl acetal) resins, the poly(vinyl acetal) resins can be formed according to any suitable method. Poly(vinyl acetal) resins can be formed by acetalization of polyvinyl alcohol with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The resulting poly(vinyl acetal) resins may have a total percent acetalization of at least about 50, at least about 60, at least about 70, at least about 75, at least about 80, at least about 85 weight percent, measured according to ASTM D1396, unless otherwise noted. The total amount of aldehyde residues in a poly(vinyl acetal) resin can be collectively referred to as the acetal component, with the balance of the poly (vinyl acetal) resin being residual hydroxyl and residual acetate groups, which will be discussed in further detail below.

The polymeric substrates according to various embodiments of the present invention can further include at least one plasticizer. Depending on the specific composition of the resin or resins in a polymer layer, the plasticizer may be present in an amount of at least about 5, at least about 15, at least about 25, or at least about 35, or at least about 50, parts per hundred parts of resin (phr) and/or not more than about 120, not more than about 100, not more than about 90, not more than about 75, not more than about 70, or not more than about 55, not more than about 50, not more than about 45, or not more than about 40 phr, or in the range of from about 5 to about 120, about 10 to about 110, about 20 to about 90, or about 25 to about 75 phr.

As used herein, the term "parts per hundred parts of resin" or "phr" refers to the amount of plasticizer present as compared to one hundred parts of resin, on a weight basis. Further, when the plasticizer content of a polymer layer is provided herein, it is provided with reference to the amount of plasticizer in the mix or melt that was used to produce the polymer layer.

According to the invention, the polymer substrate has deposited thereon one or more transparent metal or metal alloy layers that are subject to oxidation, for example aluminum, copper, silver, or gold, or alloys of any of these, including silver/gold alloys, sometimes described herein simply as "metal layer(s)." The transparent metal layers of the invention are homogeneous, coherent metallic layers comprised of one or more metals subject to oxidation, such as aluminum, of a thickness which permits substantial transparency, typically while reducing the amount of visible light transmission of the films on which the layers are deposited. The one or more metal or metal alloy layers may further comprise one or more of copper, nickel, platinum, palladium, tungsten, titanium, or alloys of any of them. The metal layers of the invention may be single layers, or may comprise more than one metal layer. If one or more metal layers are present on the polymeric substrate, the metal layers may have non-metal or metal oxide layers between each of the metal layers, for example, as disclosed in U.S. Pat. No. 5,071,206, the relevant portions of which are incorporated herein by reference. According to the invention, however, at least one of the one or more metal layers is present on the outer surface of the polymeric substrate, that is, on the surface over which the protective layer is provided, without the need, for example, of thick hardcoats or other extraordinary methods of protecting the metal layer from oxidation. We have found that the protective coating of the invention is sufficient to protect against oxidation while the subsequent LbL layer is applied. We do not intend to exclude from the definition of the one or more metal layers partial oxides or nitrides, so long as the layers are comprised predominantly of metals or metal alloys and are thus subject to the oxidative effects that the invention is intended to mitigate.

The one or more metal layers subject to oxidation may be deposited on the polymeric substrate using deposition methods known in the art. For example, the metal layer(s) may be applied to the substrate by sputtering, also known as sputter depositing, a process in which a layer of material is laid down by use of a magnetron sputterer. As further elaborated below, any other suitable deposition application, including, for example, evaporation or chemical or physical deposition, may likewise be used. The metal layers can thus be deposited by physical or chemical vapor deposition methods, such as electron-beam deposition, and the like. Magnetron sputtering is an especially suitable deposition method.

The metal layer(s) may be comprised of any transparent metal layer(s) subject to oxidation that is highly reflective in the IR range. The types and amounts of metal and metal alloys in the IR reflective layer can be manipulated to achieve the desired emissivity and VLT. For example, tungsten and titanium are more highly absorptive of light than silver and gold and thus would be most useful for embodiments with lower VLT. The metal layer(s) according to the invention may comprise either a single layer of metal or a multi-layer stack of metal.

Each of the transparent metal layers may be, for example, from about 3 to about 50 nanometers (nm) in thickness, or from 4 to 40 nm, or from 5 to 35 nm, with the total thickness of metal generally being from about 10 to about 100 nm, or from about 15 to about 75 nm. Alternatively, the transparent metal layers may be described in terms of the visible light transmission exhibited by the film after the transparent metal layer is applied. For example, visible light transmissions may be achieved of at least 2%, or at least 5%, or at least 10%, up to about 50%, or up to 60%, or up to 75%, or up to about 90%. This may also be expressed as a reduction in visible light transmission achieved by the transparent metal layer, for example, of at least about 1%, or at least 2%, or at least 5%, or at least 10%, or at least 15% or more.

In one aspect, the one or more metal layers have one or more non-metal or metal-oxide layers between them. For example, as already noted, U.S. Pat. No. 5,071,206 discloses visually transparent, color-corrected, infrared reflecting films that employ Fabry-Perot sandwich interference filters which are characterized by having three or more transparent layers of sputter-deposited metal such as silver directly contiguous with dielectric spacer layers and optionally boundary layers. The one or more metal layers of the invention may thus comprise such interference filters which, in addition to metal layers, include non-metal layers between them.

Similarly, the metal layer(s) of the invention may comprise other filter products, such as those known as "induced transmission filters" constructed of metal-dielectric sandwiches as described in U.S. Pat. No. 4,337,990, the relevant portions of which are incorporated herein by reference. Such filters may comprise a transparent substrate, overlayered with a phase matching layer, a single metallic silver layer and an outer antireflection layer, with the three overlayers constituting a transparent heat reflector. Again, no extraordinary measures need be taken to protect a metal layer on an outer surface of the polymeric substrate. According to the invention, at least one metal layer is present on the outer surface of the polymeric substrate, without the need, for example, of thick hardcoats or other extraordinary methods of protecting the metal layer from oxidation. We have found that the protective coating layer of the invention is sufficient to protect against oxidation while the subsequent composite pigment coating is applied.

Further, the one or more metal layers may comprise or be combined with a wavelength selective filter achieved with a stack of alternating high/low index of refraction dielectrics. So long as at least one of the metal layers is provided on an outer surface of the polymeric substrate, the advantages of the present invention may be obtained.

The one or more metal or metal alloy layers deposited on the polymeric substrate according to the present invention, at least one of which is provided on an outer surface of the substrate, is further provided thereon with a protective coating layer, deposited directly on the metal layer(s), using chemical or physical vapor deposition methods known in the art. According to the invention, the protective coating layer comprises one or more of a metal oxide or a metal nitride, and thus encompasses metal oxy-nitrides. The one or more metal oxides or metal nitrides of the invention may comprise, for example, oxides or nitrides of silicon, indium, tin, titanium, chromium, bismuth, zinc, and the like. This protective layer is contiguous with one of the one or more metal layers just described. "Contiguous" as used herein means being in actual contact with the adjacent layer.

The one or more metal oxides or metal nitrides of the invention are not limited with respect to the stoichiometry, and are intended to encompass any ratio of metal to oxygen or nitrogen atoms that the compounds are capable of obtaining. Thus, although silica is commonly understood and described as silicon dioxide, there is no requirement that there be a two-to-one ratio between the amount of oxygen and silicon atoms, respectively. The terms "silica" and "silicon dioxide" are thus intended to encompass any ratio of silica to oxygen that the compounds are capable of maintaining when silicon and oxygen are reacted.

The protective layer may thus be comprised of a silicon nitride, a silicon oxide (i.e., silica), or a silicon oxynitride layer, or combinations thereof. The protective layer, which may thus comprise, for example, a silicon oxide, may have a thickness from about 1 nm to about 200 nm, or from about 5 nm to about 150 nm, or from 10 to 75 nm, or from 15 nm to 60 nm. In one aspect, this layer can simply be a thin layer of silica sputtered onto the surface of the metal layer(s). The protective layer of the invention is formed on the metal layer using vapor deposition, which can be either chemical vapor deposition or physical vapor deposition, or a combination of chemical and physical vapor deposition.

Physical vapor deposition is characterized by a process in which a material goes from a condensed phase to a vapor phase and then back to a thin film condensed phase, without a significant chemical change in the material. Two common examples of physical vapor deposition are sputtering and evaporative vapor deposition. For example, the protective coating layer may be applied to the substrate by sputtering silicon oxide, silicon nitride, or mixtures thereof, also known as sputter depositing, a process in which a layer of material is laid down by use of a magnetron sputterer. Any other suitable physical vapor deposition application may likewise be used, for example electron-beam deposition, and the like. Magnetron sputtering is an especially suitable physical vapor deposition method.

Alternatively, the protective layer may be formed on the metal layer using chemical vapor deposition, a chemical process in which the substrate is exposed to one or more volatile precursors which react and/or decompose on the substrate surface to produce the desired deposit. For example, the protective layer may be formed on the metal layer(s) from a gas precursor, optionally in the presence of plasma. Plasma generation and plasma coating materials, conditions and parameters are known in the art and their selection may vary according to the desired results. Typically, precursor is introduced into the plasma using either a liquid or vapor delivery system to generate precursor gas at a rate, for example, of from 20 to 250 sccm. Plasma may be generated using a conventional plasma source and gas selected from the group consisting of $O_2$, Ar, $N_2$, He, $H_2$, $H_2O$, $N_2O$, or a combination thereof. Typical coatings may be formed using a gas-to-precursor volumetric ratio range, for example, of from 1:1 to 50:1.

In chemical vapor deposition, the gas precursor supplies the silicon component, for example, and the choice of the gas precursor is thus primarily driven by the desired composition of the protective layer, as well as by a number of other processing factors. Suitable gas precursors include metal-organic precursors such as Hexamethyldisiloxane (HMDSO), 1,1,3,3-Tetramethyldisiloxane (TMDSO), tetraethyl orthosilicate (TEOS), silicon tetrahydride or silane ($SiH_4$), Tetraethoxysilane, Decamethyltetrasiloxane, 1,3-Diethoxy-1,1,3,3-tetramethyldisiloxane, Tris(trimethylsilyl)silane, Hexamethylcyclotrisiloxane, 1,3,5,7-Tetravinyltetramethylcyclotetrasiloxane, Decamethylcyclopentasiloxane, Octamethylcyclotetrasiloxane, and amines, acetates and beta diketonates of these. In an embodiment where the silicon-based material in the protective layer is silicon oxide, or silica, for example, the gas precursor is preferably selected from the group consisting of HMDSO (Hexamethyldisiloxane), TMDSO (Tetramethyldisiloxane), TEOS (tetraethyl orthosilicate) and $SiH_4$ (silicon tetrahydride or silane).

While the gas precursor in chemical vapor deposition processes is in the form of a gas (or vapor) during the applying step, it will be understood that it may originally be in a liquid or fluid form such that the method of the present invention may optionally include transforming a fluid precursor to gas or vapor form, for example by heating, prior to or simultaneously with the applying step. More specifically, the transforming step may include heating liquid precursor to vaporize the liquid precursor a sufficient amount to create a vapor pressure of typically about at least 10 Torr. The process may include combining the gas precursor with a carrier gas to form a precursor/carrier gas mix, for example in a bubbler arrangement, preferably further including measuring and regulating the flow of the precursor/carrier gas mix with suitable methods and equipment such as with a mass flow controller.

The optical products of the invention are intended to further comprise a composite pigment coating. We note that typically Layer-by-Layer (LbL) coatings can be applied directly to bare polymeric substrates, or at most the PET is corona-treated prior to coating. However, the LbL process exposes the surface to alkaline pH (around 9.5 or higher in some cases) and high conductivity solutions (50 mM NaCl or more). Metal layers such as sputtered aluminum films undergo rapid oxidation under these conditions, and rapidly become alumina, which has little value in solar control applications. One indication of oxidation is a reduction in efficacy as a solar control film, as evidenced by a reduction in the blocking of infrared radiation, for example.

We have found according to the invention that sputtering a thin layer of silica onto the surface of an aluminum film protects it from oxidation long enough to survive LbL deposition. Approximately 60 nm of silica have been shown to prevent oxidation, but we expect that even less will be sufficient. We have found that either 100 nm and 60 nm coatings of silica are satisfactory, as demonstrated by the continuing ability of the underlying metal layer(s) to block infrared radiation. We therefore believe that most conventional LbL films can be applied according to the invention without fear of degrading the underlying metal layer, and the performance of such conventional window film products can be adjusted to include any desired color.

Thus, in various aspects, the protective coating layer, for example silica, may be at least 5 nm thick, or at least 10 nm thick, or at least 15 nm thick, up to about 60 nm, or up to about 75 nm, or up to 100 nm, or up to 150 nm. While there is in theory no upper limit to the thickness of the silicon-based protective coating, one skilled in the art will understand that no more of the coating need be used than is sufficient to shield the metal layer(s) while the subsequent composite pigment coating is applied.

The present invention is thus directed to an optical product comprising a polymeric substrate provided thereon with a metal layer subject to corrosion on which is provided a protective layer as just described, and is further provided with a composite pigment coating. The composite pigment coating includes at least a first layer and a second layer to form a bilayer, at least one of which layers comprises or includes a pigment. Preferably, the first layer is immediately adjacent the protective layer and a second layer is immediately adjacent to the first layer which was applied to or deposited on the silicon-based protective coating. The first and second layer together thus form a bilayer. One or more additional first and second layers may be used to form a plurality of bilayers. Each of these bilayers or the plurality of bilayers taken together may also be described herein as a bilayer system, or an LbL coating. Each of the bilayers can be the same or different.

According to the invention, the composite pigment coating comprises a layer-by-layer coating that includes one or more pigments. Each of the layers of a given bilayer may comprise a polyionic binder, an insoluble pigment particle, or both. Each layer of the bilayer(s) includes a binding group component with the binding group component of the first layer and the binding group component of the second layer constituting a complementary binding group pair. As used herein, the phrase "complementary binding group pair" means that binding interactions, such as electrostatic binding, hydrogen bonding, Van der Waals interactions, hydrophobic interactions, and/or chemically-induced covalent bonds are present between the binding group component of the first layer and the binding group component of the second layer of the composite coating. A "binding group component" is a chemical functionality that, in concert with a complementary binding group component, establishes one or more of the binding interactions described above. The components are complementary in the sense that binding interactions are created through their respective charges.

According to the invention, the binding group component may be provided, for example, through a polyionic binder or a pigment. That is, if a selected pigment is charged, for example, so that it can serve as a binding group component of a given layer of the bilayer system, then that pigment may be used alone to form a layer of the bilayer. If the pigment does not include a binding group component, then that pigment may be combined with a molecule having a binding group component, for example a polyionic binder, to form a bilayer. We note that not every bilayer of the bilayer system need include a pigment, but according to the invention, those bilayers that include a pigment may have either a charged pigment or an uncharged pigment, or both.

According to the invention, the first layer of the composite pigment coating may thus include a polyionic binder, which is defined as a macromolecule containing a plurality of either positively- or negatively-charged moieties along the polymer. Polyionic binders with positive charges are known as polycationic binders while those with negative charges are termed polyanionic binders. Also, it will be understood by one of ordinary skill that some polyionic binders can function as either a polycationic binder or a polyanionic binder, depending on factors such as pH, and are known as amphoteric. The charged moieties of the polyionic binder constitute the "binding group component" of a given layer.

Suitable polycationic binder examples include poly(allylamine hydrochloride), linear or branched poly(ethyleneimine), poly(diallyldimethylammonium chloride), macromolecules termed polyquaterniums or polyquats and various copolymers thereof. Blends of polycationic binders are also contemplated by the present invention.

Suitable polyanionic binder examples include carboxylic acid-containing compounds such as poly(acrylic acid) and poly(methacrylic acid), as well as sulfonate-containing compounds such as poly(styrene sulfonate) and various copolymers thereof. Blends of polyanionic binders are also contemplated by the present invention. Polyionic binders of both polycationic and polyanionic types are generally known to those of ordinary skill in the art and are described, for example, in U.S. Published Patent Application number US20140079884 to Krogman et al, incorporated herein by reference. Examples of suitable polyanionic binders include polyacrylic acid (PAA), poly(styrene sulfonate) (PSS), poly (vinyl alcohol) or poly(vinylacetate) (PVA, PVAc), poly (vinyl sulfonic acid), carboxymethyl cellulose (CMC), polysilicic acid, poly(3,4-ethylenedioxythiophene) (PEDOT) and combinations thereof with other polymers (e.g. PEDOT:PSS), polysaccharides, and copolymers of the above mentioned. Other examples of suitable polyanionic binders include trimethoxysilane functionalized PAA or PAH or biological molecules such as DNA, RNA or proteins. Examples of suitable polycationic binders include poly (diallyldimethylammonium chloride) (PDAC), Chitosan, poly(allyl amine hydrochloride) (PAH), polysaccharides, proteins, linear poly(ethyleneimine) (LPEI), branched poly (ethyleneimine) BPEI and copolymers of the above-mentioned, and the like. Examples of polyionic binders that can function as either polyanionic binders or polycationic binders include amphoteric polymers such as proteins and copolymers of the above mentioned polycationic and polyanionic binders.

The concentration of the polyionic binder in the first layer may be selected based in part on the molecular weight of its charged repeat unit but will typically be between 0.1 mM-100 mM, more preferably between 0.5 mM and 50 mM, and most preferably between 1 and 20 mM based on the molecular weight of the charged repeat unit.

According to the invention, if the binding group component of a given layer includes a negatively-charged pigment, then the polyionic binder of a complementary layer will typically be a polycationic binder, such as polyallylamine hydrochloride. The polyionic binders will typically be soluble in water and the composition used to form the layer will be an aqueous solution of polyionic binder. In an embodiment wherein the polyionic binder is a polycation and the first layer is formed from an aqueous solution, the pH of the aqueous solution may be selected so that from 5 to 95%, preferably 25 to 75%, and more preferably approximately half of the ionizable groups are protonated. Other optional ingredients in the first layer include biocides or shelf-life stabilizers.

It will be understood that when the first layer of a bilayer comprises a polycationic binder, the second layer may comprise a polyanionic binder or a negatively-charged insoluble pigment particle, or both. Of course, additional functionality may be provided to the optical products of the invention in the composite pigment coating. For example, one or more of the layers may be provided with electromagnetic energy-absorbing insoluble particles, which themselves may be charged particles. The phrase "electromagnetic energy-absorbing" means that the particle is purposefully selected as a component for the optical product for its preferential absorption at particular spectral wavelength(s) or wavelength ranges(s). The term "insoluble" is meant to reflect the fact that the particle does not substantially dissolve in the composition used to form a given layer and exists as a particle in the optical product structure. Of course, the term electromagnetic energy-absorbing insoluble particles encompasses pigments; however, insoluble particles such as UV absorbers or IR absorbers, or absorbers in various parts of the electromagnetic spectrum that do not necessarily exhibit color are also within the term and may be provided according to the invention.

Pigments suitable for use according to the invention are preferably particulate pigments with an average particle diameter from about 5 to about 300 nanometers, or from 10 to 50 nanometers, often referred to in the art as nanoparticle pigments, although there is not necessarily an upper limit to the particle size in those cases where a larger particle size may perform well in the LbL processes useful according to the invention. In one aspect, the surface of the pigment includes the binding group component of a given layer. Suitable pigments are available commercially as colloidally-stable water dispersions from manufacturers such as Cabot, Clariant, DuPont, Dainippon and DeGussa. Particularly suitable pigments include those available from Cabot Corporation under the Cab-O-Jet® name, for example 250C (cyan), 265M (magenta), 270Y (yellow) or 352K (black). In order to be stable in water as a colloidal dispersion, the pigment particle surface is typically treated to impart ionizable character thereto and thereby provide the pigment with the desired binding group component on its surface. It will be understood that commercially available pigments are sold in various forms such as suspensions, dispersions and the like, and care should be taken to evaluate the commercial form of the pigment and modify it as/if necessary to ensure its compatibility and performance with the optical product components, particularly in the embodiment wherein the pigment surface also functions as the binding group component of the second layer.

Multiple pigments may be utilized to achieve a specific hue or shade or color in the final product; however, it will again be understood that, should multiple pigments be used, they should be carefully selected to ensure their compatibility and performance both with each other and with the optical product components. This is particularly relevant in the embodiment wherein the pigment surface also functions as the binding group component of the layer, as for example particulate pigments can exhibit different surface charge densities due to different chemical modifications that can impact compatibility.

One or more of the layers of the LbL composite pigment coating may further include a screening agent that promotes even and reproducible deposition of the layer via improved dispersion of the pigment or polyionic binder within the layer by increasing ionic strength and reducing interparticle electrostatic repulsion. Screening agents are known to those of ordinary skill in the art and are described for example in U.S. Published Patent Application number US20140079884 to Krogman et al. Examples of suitable screening agents include low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents. Sodium chloride is typically a preferred screening agent based on ingredient cost. The presence and concentration level of a screening agent may allow for higher loadings of the pigment or the binder such as those that may be desired in optical products with a $T_{vis}$ of no more than 50% and also may allow for customizable and carefully controllable loadings in order to achieve customizable and carefully controllable optical product $T_{vis}$ levels.

Suitable screening agent concentrations can vary with salt identity and are also described for example in U.S. Published Patent Application number US20140079884 to Krogman et al, incorporated herein by reference in its entirety. In some embodiments, the screening agent concentration can range between 1 mM and 1000 mM or between 10 mM and 100 mM or between 30 mM and 80 mM. In some embodiments the screening agent concentration is greater than 1 mM, 10 mM, 100 mM or 500 mM.

The layers of the composite pigment coating may also contain other ingredients such as biocides or shelf-life stabilizers.

As noted, the composite pigment coatings of the invention may comprise a plurality of bilayers that may be the same or different. For example, an optical product of the invention may include first and second bilayers, each with a first layer and a second layer. For embodiments with a plurality of bilayers, it will be appreciated that the binders or pigments for each of the layers of a bilayer may be independently selected and that the layers containing pigment, for example, will in combination provide an additive effect to the optical product. This additive effect can be customized and carefully controlled in part by the concentration of the pigment particles in each of the layers used as dispersed through the presence of the screening agent. For example, pigmented layers will in combination provide approximately an additive effect on the visually perceived color of the optical film product. In embodiments in which a plurality of bilayers are provided that include pigments, the pigments for each of the layers may be of the same or similar composition and/or color such that the additive effect is to increase intensity or depth or darkness of the visually perceived color of the optical product or, stated another way, to reduce electromagnetic transmittance in the visible wavelength range (or $T_{vis}$).

In one embodiment, carbon black is used as the pigment for at least one layer and pigments such as those listed above are used as pigments for other layer(s) such that the additive effect is a visually perceived darkened color, reducing electromagnetic transmittance in the visible wavelength range (or $T_{vis}$). As discussed above, the present invention may be useful in products wherein relatively high levels of darkening are desired. Accordingly, in one embodiment, the optical products of the present invention have a $T_{vis}$ of no more than 50%, or no more than 70%. In yet another embodiment, the pigments for each layer may be of complementary composition and/or color such that the additive effect is a visually perceived color different from and formed by their combination of the individual pigments, for example an additive perceived "green" color achieved by utilizing a blue pigment for one layer and a yellow pigment for another layer.

One of ordinary skill will appreciate that the term "coloring" means, for example, imparting a color, multiple colors or an aesthetic color-based design or pattern to the opaque article.

In another aspect, the present invention is directed to methods for forming optical products. In one embodiment, the method of the present invention includes: (a) applying one or more metal layers to a polymeric substrate; (b) applying to the one or more metal layers a protective layer; and (c) applying to the protective layer a composite pigment coating. The composite pigment coating may be applied to the protective layer by applying a first layer to the protective layer and thereafter applying a second layer to form a bilayer. The first layer of the bilayer may include a polyionic binder and/or a pigment, and the second layer may likewise include a binder and/or a pigment, with each of the first and second layers including a binding group component which together form a complementary binding group pair. At least one of the layers, and especially those layers that include a charged pigment particle, may include a screening agent as defined above.

In a preferred embodiment, at least one of the first and second layers are applied as an aqueous dispersion or solution and most preferably both of the first and second layers are an aqueous dispersion or solution. In this embodiment, both applying steps (a) and (b) are performed at ambient temperature and pressure.

The optical products of the present invention are preferably manufactured using known "layer-by-layer" (LbL) processes such as described in Langmuir, 2007, 23, 3137-3141 or in U.S. Pat. Nos. 8,234,998 and 8,689,726 and U.S. Published Application US 20140079884, co-invented by co-inventor Krogman of the present application, the disclosures of which are incorporated herein by reference.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

EXAMPLES

A polymer binder solution was prepared by dissolving 1.87 g of poly(allylamine hydrochloride) per liter of deionized water, and titrating the pH of the resulting solution to 9.5 using sodium hydroxide. A 0.5 wt % solids pigment solution was created by diluting 33.33 g Cab-o-Jet 352K carbon black, a colloidally stable carbon black pigment commercially available from Cabot Corp., to 1 L with distilled water, and adding 2.92 g of sodium chloride to ionically screen the colloidal particles and prepare them for deposition. Experimental film samples were prepared and tested using these solutions according to the following description.

A film of PET having a thickness of 3 mil was sputter coated with a layer of aluminum to a visible light transmission of approximately 72%. The layer of aluminum then had deposited on it a layer of silica, using plasma-enhanced chemical vapor deposition to a layer thickness of either 60 nm or 100 nm. A composite film was thereafter deposited on the silica-protected layer by exposing the silica-protected metalized PET to alternating sprays of the polymer binder solution and the pigment solution described above. Each of the alternating sprays was for a period of approximately 10 seconds, followed by a rinse with deionized water of approximately 6 seconds. In this case 20 bilayers were applied, which means the surface was wetted with high conductivity alkaline solution for a total of 20 passes. When unprotected metallized PET was exposed to the first alkaline solution, we immediately observed that the film went transparent, indicating the aluminum metal had either dissolved or oxidized. The LbL process was discontinued at that point and no VLT values were obtained.

Figure 2:
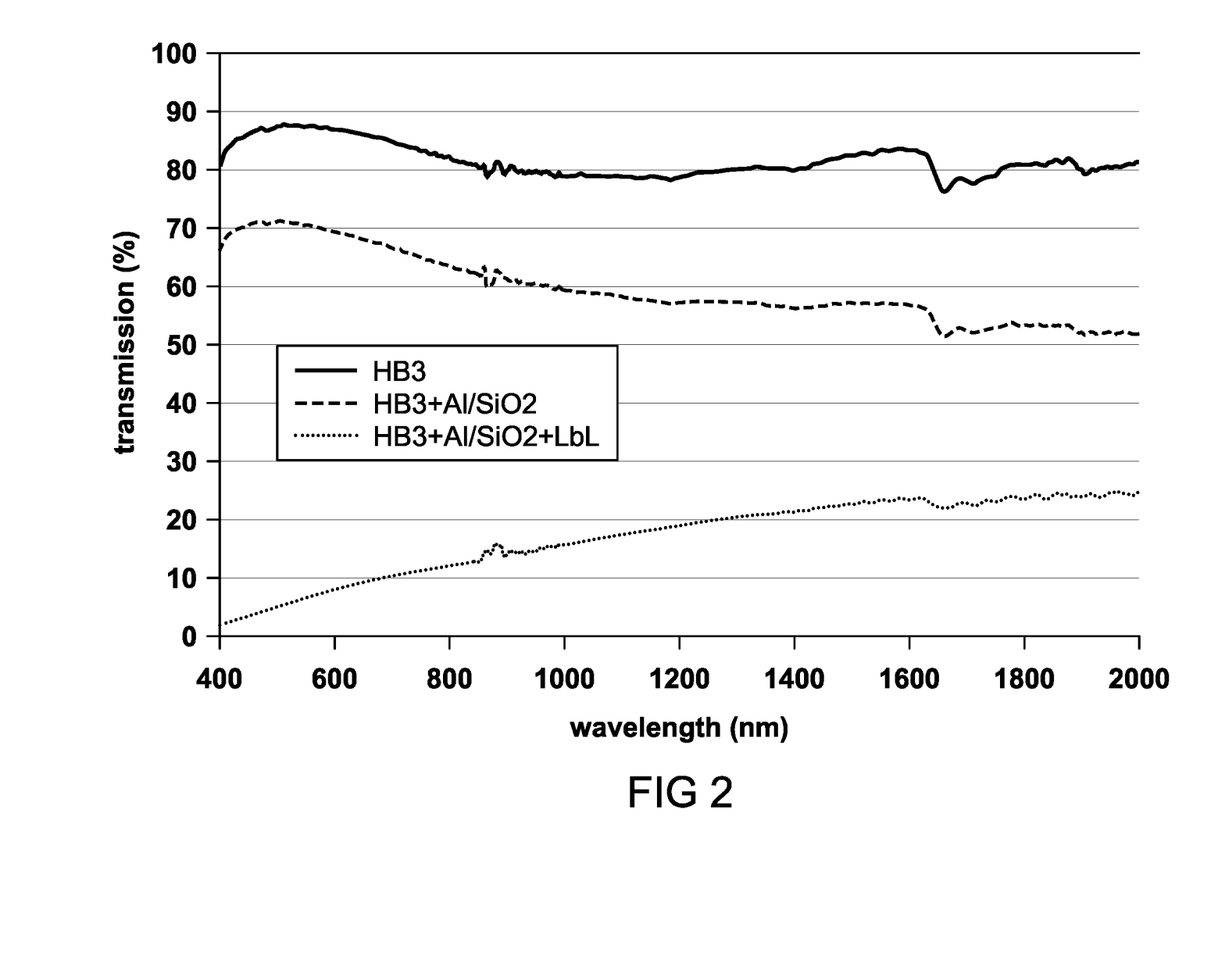
FIG. 2 is a plot of percent transmission of subject films with and without the composite coating of the invention.

The results as set out in FIG. 2 indicate that the infrared performance after the LbL coating was applied to the inventive examples confirmed that the aluminum layer had not been oxidized to alumina, but was protected by the thin silica layer having a 60 nm thickness. Through use of the LbL coating, the metalized film was thereby darkened from 72% visible transmission to 7.5% visible transmission. In FIG. 2, HB3 is polyethylene terephthalate film, HB3+Al/SiO2 indicates that both an aluminum layer and a silica layer have been applied, while HB3+Al/SiOx+LbL indicates that a composite pigmented coating has also been applied.

A person skilled in the art will recognize that the measurements described herein are measurements based on publicly available standards and guidelines that can be obtained by a variety of different specific test methods. The test methods described represent only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in electromagnetic energy of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. An optical product comprising:
   a) a polymeric substrate, provided with an infrared-reflective metal layer on an outer surface thereof that is subject to oxidation;
   b) a protective coating, comprising one or more of a metal oxide or a metal nitride, deposited directly on the infrared-reflective metal layer using chemical or physical vapor deposition; and
   c) a composite pigment coating, deposited on the protective coating, comprising at least a first layer and a second layer, at least one of which layers comprises a first pigment, wherein each of the first layer and the second layer includes a binding group component which together form a complementary binding group pair,
   wherein the first layer and the second layer together form a layer-by-layer bilayer, and
   wherein the composite pigment coating comprises a plurality of layer-by-layer bilayers, each of which bilayers may be the same or different than the bilayer formed from the first layer and the second layer.

2. The optical product of claim 1, wherein the polymeric substrate comprises a polyethylene terephthalate film.

3. The optical product of claim 1, wherein the infrared-reflective metal layer comprises aluminum.

4. The optical product of claim 1, wherein the polymeric substrate provided with an infrared-reflective metal layer exhibits a visible light transmission of at least 70% prior to the protective coating being deposited on the infrared-reflective metal layer.

5. The optical product of claim 1, wherein the one or more of a metal oxide or a metal nitride comprises silica.

6. The optical product of claim 1, wherein the protective coating has a thickness of from 5 nm to 150 nm.

7. The optical product of claim 1, wherein the composite pigment coating has a total thickness of 5 nm to 300 nm.

8. The optical product of claim 1, wherein the first pigment is provided on its surface with a binding group component.

9. The optical product of claim 1, wherein the first pigment comprises carbon black.

10. The optical product of claim 1, wherein the composite pigment coating comprises a second pigment which, in combination with the first pigment, provide an additive effect on the perceived color of the optical product.

11. The optical product of claim 1, in the form of a window film that is applied to a vehicle.

12. The optical product of claim 10, wherein the vehicle is an automobile, an aircraft, or a boat.

13. The optical product of claim 2, wherein the optical product is a composite interlayer for laminated glass.

14. The optical product of claim 1, wherein at least one of the first layer and the second layer of the composite pigment coating is formed from an aqueous solution.

15. The method of claim 1, wherein each of the layers of a given bilayer comprises a polyionic binder, an insoluble pigment particle, or both.

16. The method of claim 1, wherein the first layer comprises a polycationic binder and the second layer comprises a negatively-charged pigment.

17. The method of claim 16, wherein the polycationic binder comprises poly(allylamine hydrochloride).

18. The method of claim 15, wherein the insoluble pigment particle comprises carbon black pigment.

19. The method of claim 1, wherein the complementary binding group pair exhibits electrostatic binding.

20. A colored window film, comprising:
   a) a polyethylene terephthalate film, provided with a metal layer on an outer surface thereof that is subject to oxidation;
   b) silica, deposited directly on the metal layer using chemical vapor deposition; and
   c) a composite pigment coating, deposited on the silica, that comprises at least a first layer and a second layer, at least one of which layers comprises a first pigment, wherein each of the first layer and the second layer include a binding group component which together form a complementary binding group pair;
   wherein the first layer and the second layer together form a layer-by-layer bilayer, and
   wherein the composite pigment coating comprises a plurality of layer-by-layer bilayers, each of which bilayers may be the same or different than the bilayer formed from the first layer and the second layer.

* * * * *